United States Patent
Jiang et al.

(10) Patent No.: US 11,511,257 B2
(45) Date of Patent: *Nov. 29, 2022

(54) SYNTHETIC SILICA AS PACKING MATERIAL IN SUPPORTED LIQUID EXTRACTION

(71) Applicant: Agilent Technologies, Inc., Santa Clara, CA (US)

(72) Inventors: Kunqiang Jiang, Wilmington, DE (US); Derick Lucas, Wilmington, DE (US); Bruce Richter, West Grove, PA (US)

(73) Assignee: AGILENT TECHNOLOGIES, INC., Santa Clara, CA (US)

(*) Notice: Subject to any disclaimer, the term of this patent is extended or adjusted under 35 U.S.C. 154(b) by 112 days.

This patent is subject to a terminal disclaimer.

(21) Appl. No.: 16/844,505

(22) Filed: Apr. 9, 2020

(65) Prior Publication Data
US 2020/0269213 A1    Aug. 27, 2020

Related U.S. Application Data

(63) Continuation of application No. 16/225,243, filed on Dec. 19, 2018, now Pat. No. 10,661,250.
(Continued)

(51) Int. Cl.
*B01J 20/10* (2006.01)
*B01D 11/02* (2006.01)
(Continued)

(52) U.S. Cl.
CPC .......... *B01J 20/10* (2013.01); *B01D 11/0215* (2013.01); *B01J 20/283* (2013.01);
(Continued)

(58) Field of Classification Search
None
See application file for complete search history.

(56) References Cited

U.S. PATENT DOCUMENTS

| 5,190,922 A | 3/1993 | Chen et al. |
| 5,906,747 A * | 5/1999 | Coffman ............... C07K 1/18 |
| | | 210/635 |

(Continued)

FOREIGN PATENT DOCUMENTS

| EP | 3104156 A1 | 12/2016 |
| EP | 2694527 B1 | 1/2017 |

(Continued)

OTHER PUBLICATIONS

Teledyne ("Overview of Silica Column Sample Loading Techniques", 2012, pp. 1-4). (Year: 2012).*
(Continued)

*Primary Examiner* — Clare M Perrin
(74) *Attorney, Agent, or Firm* — Mannava & Kang, P.C.; Carol L. Bunner

(57) ABSTRACT

In embodiments, a packing material for supported liquid extraction has a sorbent media that includes synthetic silica particles. In embodiments, the synthetic silica particles can have physical properties relating to one or more of particle surface area, shape, size, or porosity. In one embodiment, synthetic silica particles have a surface area less than about 30 m²/g. In another embodiment, the synthetic silica particles have an approximately uniform particle shape. In further examples, synthetic silica particles have a particle size in a range of about 30-150 μm inclusive or greater than about 200 μm. In another embodiment, synthetic silica particles are arranged to have a pore size greater than about (Continued)

500 Angstroms. In an embodiment, an apparatus for supported liquid extraction includes a container and a sorbent media that includes synthetic silica particles. In a further embodiment, a method for extracting target analytes through supported liquid extraction is provided.

7 Claims, 5 Drawing Sheets

Related U.S. Application Data

(60) Provisional application No. 62/657,532, filed on Apr. 13, 2018.

(51) Int. Cl.
  *B01J 20/28* (2006.01)
  *B01J 20/283* (2006.01)
  *C02F 1/26* (2006.01)
  *B01D 15/00* (2006.01)

(52) U.S. Cl.
  CPC ... *B01J 20/28004* (2013.01); *B01J 20/28019* (2013.01); *B01J 20/28059* (2013.01); *B01J 20/28085* (2013.01); *C02F 1/26* (2013.01); *B01D 15/00* (2013.01); *B01J 2220/52* (2013.01); *B01J 2220/56* (2013.01)

(56) References Cited

U.S. PATENT DOCUMENTS

| | | |
|---|---|---|
| 6,190,922 B1 | 2/2001 | Chen et al. |
| 6,402,939 B1 | 6/2002 | Yen et al. |
| 7,270,742 B2 | 9/2007 | Karas et al. |
| 7,314,545 B2 | 1/2008 | Karas et al. |
| 8,507,292 B2 | 8/2013 | Srinivasan et al. |
| 8,574,923 B2 | 11/2013 | Cooney et al. |
| 9,063,045 B2 | 6/2015 | Srinivasan et al. |
| 9,272,260 B2 | 3/2016 | Hammond et al. |
| 9,371,524 B2 | 6/2016 | Will |
| 9,696,284 B2 | 7/2017 | Rannisto et al. |
| 9,821,248 B2 | 11/2017 | Chua |
| 2011/0077393 A1 | 3/2011 | Hammond et al. |
| 2012/0028368 A1 | 2/2012 | Srinivasan et al. |
| 2014/0124444 A1* | 5/2014 | Anspach ............. G01N 30/603 210/656 |
| 2014/0228549 A1 | 8/2014 | Schembecker et al. |
| 2016/0209304 A1 | 7/2016 | Edgington et al. |

FOREIGN PATENT DOCUMENTS

| | | | |
|---|---|---|---|
| WO | 2016115101 A1 | 7/2016 | |
| WO | WO-2016115101 A1 * | 7/2016 | ............ B01J 20/287 |

OTHER PUBLICATIONS

Majors, R., "Supported Liquid Extraction: The Best-Kept Secret in Sample Preparation", LCGC Europe, vol. 25, Issue 8, Aug. 1, 2012, 430-435.

* cited by examiner

SYNTHETIC SILICA AS PACKING MATERIAL IN SUPPORTED LIQUID EXTRACTION

CROSS-REFERENCE TO RELATED APPLICATIONS

This application is a continuation under 35 U.S.C. § 120 of U.S. patent application Ser. No. 16/225,243, filed Dec. 19, 2018, which claims the benefit of priority of U.S. provisional patent application, Appl. No. 62/657,532, filed Apr. 13, 2018, each of which is incorporated in its entirety herein by reference.

TECHNICAL FIELD

The present disclosure relates generally to the field of sample preparation.

BACKGROUND

Liquid extraction uses relative solubility differences to separate chemical substances from one liquid phase (solvent) into another prior to chemical analysis. Two major types of liquid extraction are Liquid-Liquid Extraction (LLE) and Supported Liquid Extraction (SLE). SLE uses a bed of packing material also referred to as a SLE stationary phase or packing bed. The packing material is placed into a container, such as, a cartridge, column, or well of a 96-well plate.

In one known SLE procedure, an aqueous sample containing analytes is loaded into a SLE container having a packing bed. The packing bed absorbs the sample and spreads it throughout the bed by capillary action. This creates a thin film over the surface area of the packing bed material. To extract analytes of interest, an appropriate organic solvent is introduced into the container to percolate through the packing bed and contact the thin film of aqueous sample. Analytes of interest transfer from the aqueous sample into the organic solvent and are eluted from the container and collected. Water and unextracted impurities remain in the stationary phase. The eluted analytes can then be exchanged into a more suitable solvent for analysis or injected directly depending on the type of detection to be used.

Compared to conventional LLE methods, the SLE approach offers many advantageous features including better reproducibility, lower solvent consumption, elimination or minimization of hazardous solvents, the elimination of emulsions, and is amenable to high-throughput workflows (i.e. automation). The technique of SLE has been widely applied in pharmaceutical industries, forensic chemistry, and environmental analysis.

The success of SLE extraction relies on the quality of the stationary phase materials. Ideally the stationary phase should provide a consistent flow pattern, high cleanliness, comparable or better performance as LLE, and low cost. Conventionally, the packing material used in SLE devices is diatomaceous earth, which is a naturally occurring material composed mostly of silica. Although diatomaceous earth is cost-effective it suffers from a series of issues including lot-to-lot variation in particle morphology, shape and unwanted impurities. Additionally, low levels of crystalline silicon dioxide incurred in diatomaceous earth may present occupational health risks to workers' including silicosis and carcinogenicity necessitating strict regulatory controls in manufacturing environments. There is a need for alternative packing materials for SLE methods that can provide superior material consistency, cleanliness, cost effectiveness, and with less health concerns.

A synthetic sorbent different from the present disclosure has been made available by Phenomenex (Torrance, Calif.) currently referred to as a SLE product, Novum™. Unlike conventional SLE products based on diatomaceous earth, the Novum™ product appears to use a synthetic SLE sorbent for both SLE tubes and 96 well plates.

OVERVIEW

The inventors recognized what is needed is an improved and safer packing material for SLE compared to conventional diatomaceous earth SLE products. The inventors also recognized that improvements were needed in SLE packing materials having synthetic silica.

In embodiments, a packing material for supported liquid extraction has a sorbent media that includes synthetic silica particles. In embodiments the synthetic silica particles can be fine tuned to have particular physical properties relating to one or more of particle surface area, shape, size, or porosity.

In one embodiment, synthetic silica particles have a surface area less than about 30 m2/g.

In a further embodiment, the synthetic silica particles have an approximately uniform particle shape. In an example, an approximately uniform particle shape is an approximately spherical shape having an approximately uniform diameter across a distribution of the particles.

In a further embodiment, synthetic silica particles have a particle size in a range of about 30-150 μm inclusive.

In a further embodiment, synthetic silica particles have a particle size greater than about 200 μm.

In a further embodiment, synthetic silica particles are arranged to have a pore size greater than about 500 Angstroms.

In further embodiments, the synthetic silica particles can include at least one of Agilent SLE materials 1, 2, or 3.

In another embodiment, an apparatus for supported liquid extraction includes a container and a sorbent media. The sorbent media is positioned within the container for use as a stationary phase in supported liquid extraction. The sorbent media includes synthetic silica particles.

In a further embodiment, a method for extracting target analytes through supported liquid extraction is provided. The method includes positioning sorbent media in a container, wherein the sorbent media includes synthetic silica particles having a surface area less than about 30 m2/g and an approximately uniform particle shape. The method can also include loading an aqueous sample onto the sorbent media, and equilibrating the loaded sample and the sorbent media to obtain a layer of the aqueous sample on the synthetic silica particles. Further steps include eluting the obtained aqueous sample layer on the synthetic silica particles with organic solvent to extract target analytes, and outputting the extracted target analytes for analysis.

In a further embodiment, the synthetic silica particles have a particle size of less than about 150 μm, and the method includes applying a positive pressure or vacuum to initiate a flow of the aqueous sample through the synthetic silica media at a consistent flow rate. In another embodiment, the synthetic silica particles have a particle size greater than about 200 μm, and the method includes initiating with gravity a flow of the aqueous sample through the sorbent media at a consistent flow rate.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DESCRIPTION OF EXAMPLE EMBODIMENTS

Figure 1:
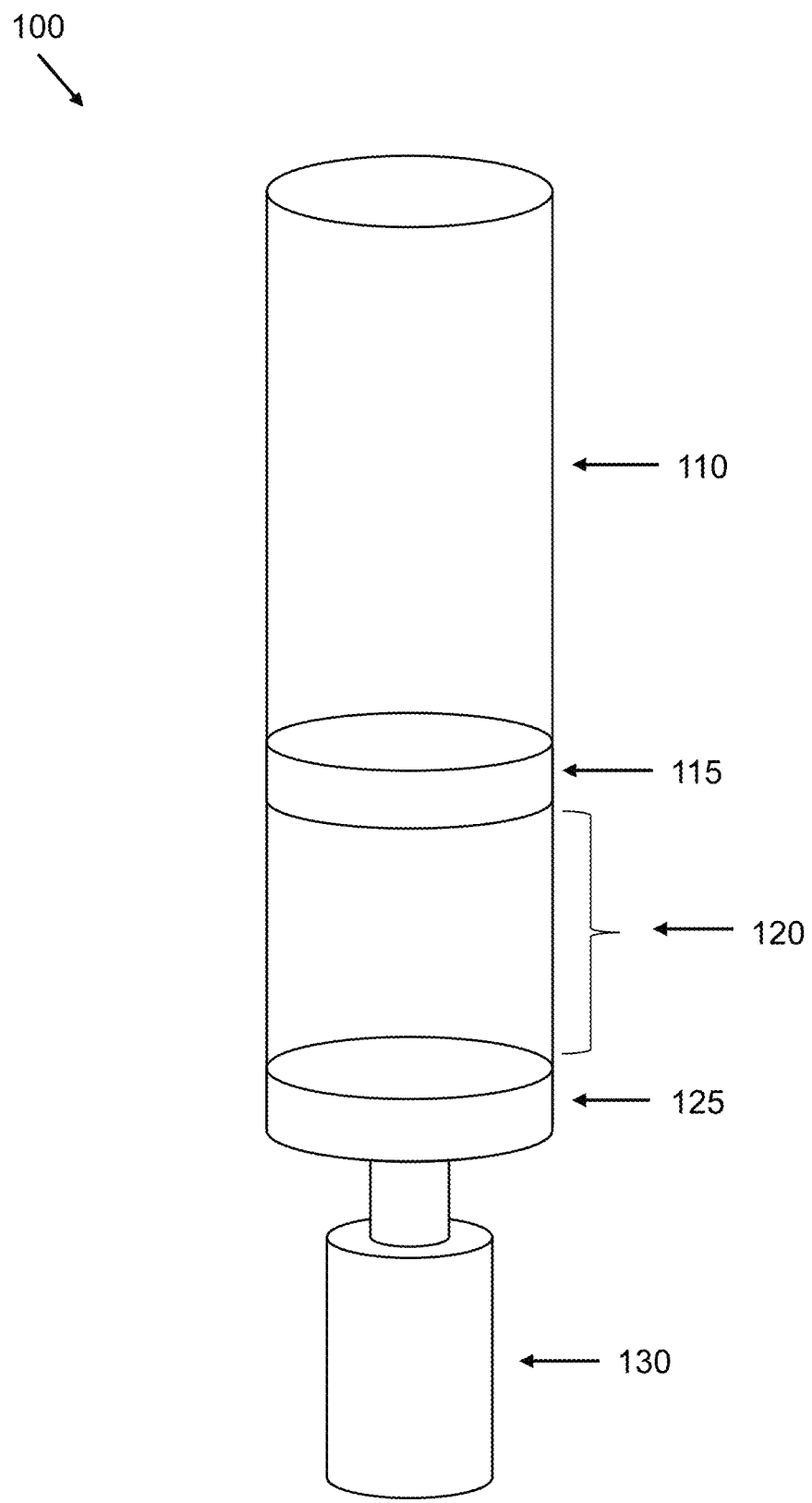
FIG. 1 is a diagram of an apparatus having synthetic silica for use as a stationary phase in SLE according to an embodiment.

Example embodiments are described herein in the context of sample preparation and in particular with respect to containers and applications involving supported liquid extraction (SLE). Embodiments described here include a sorbent media having synthetic silica particles for SLE. Embodiments include packing materials and apparatuses for SLE, and methods for extracting target analytes through supported liquid extraction (SLE).

The inventors identified several features and parameters that can be used in preferred embodiments of the sorbent media having synthetic silica particles for SLE. First, synthetic silica particles with low surface area (less than about <30 m2/g) and large pore size (greater than about >500 Å) provide an ideal SLE performance in an embodiment. Second, for vacuum or positive pressure flow initiation, particle sizes should be in the range of about 30-150 microns to ensure a consistent eluent flow at a rate that gives efficient analyte extraction without the need for high vacuum or pressure. For gravity flow initiation, the particle size should be larger than about 200 microns to ensure acceptable flow rates. The synthetic silica particles should be of high cleanliness to avoid the introduction of impurities that can lead to analytical variability.

Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Synthetic Silica Packing Material for SLE

In an embodiment, a sorbent media having synthetic silica particles is used as a packing material. For example, a sorbent media made up of synthetic silica particles can be used as a stationary phase material in SLE. In embodiments, as described further below, synthetic silica particles can be used having particular physical properties including surface area, shape, particle size, or porosity. Using synthetic silica particles as described herein overcomes disadvantages of other known SLE bed materials and allows more control of physical properties of the packing material to improve SLE sample preparation.

The inventors found a number of further examples with particular physical properties that are advantageous. In one example, with respect to particle surface area, a sorbent media includes synthetic silica particles having a surface area less than about 30 m2/g.

In a further feature, the synthetic silica particles have an approximately uniform particle shape. For example, the approximately uniform particle shape can be approximately spherical shape and have an approximately uniform diameter across a distribution of the particles. The approximately uniform particle shape can also be rounded in oblong, ovals or other rounded shapes without shards, sharp, pointed or jagged edges.

Further embodiments relate to particle sizes. In one example, the synthetic silica particles have a particle size in a range of about 30-150 μm inclusive. In another example, synthetic silica particles have a particle size greater than about 200 μm.

In a further feature, porosity of the synthetic silica particles is considered. In one example, the synthetic silica particles are arranged to have a pore size greater than about 500 Angstroms (Å).

Finally, in examples, the inventors developed three types of synthetic silica particles manufactured by Agilent Technologies Inc., and referred to herein as Agilent SLE material 1, 2, or 3. These three types of synthetic silica particles have different particle size distributions from one another. The first type, noted as Agilent SLE material 1 in the following context, has relatively small particle size (less than 150 μm) and requires positive pressure or vacuum to initiate flow of liquid through the sorbent bed. The second type, noted as Agilent SLE material 2 in the following context, has a larger particle size (greater than 600 μm) and supports flow of liquids under gravity (gravity flow without the need of positive pressure or vacuum manifold). A third type, noted as Agilent SLE material 3 has particle size 300 μm and also supports eluent flow under gravity.

Figure 4:
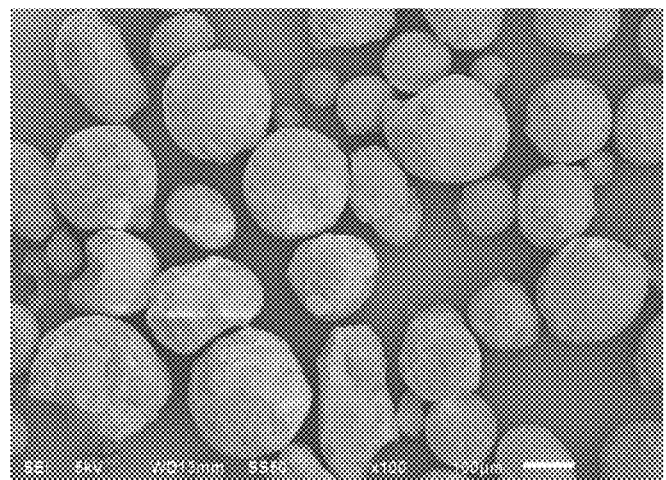
FIG. 4 shows Scanning Electronic Microscopic (SEM) Images of Agilent SLE material 1 used for SLE under 100× magnification according to an embodiment.
Figure 5:
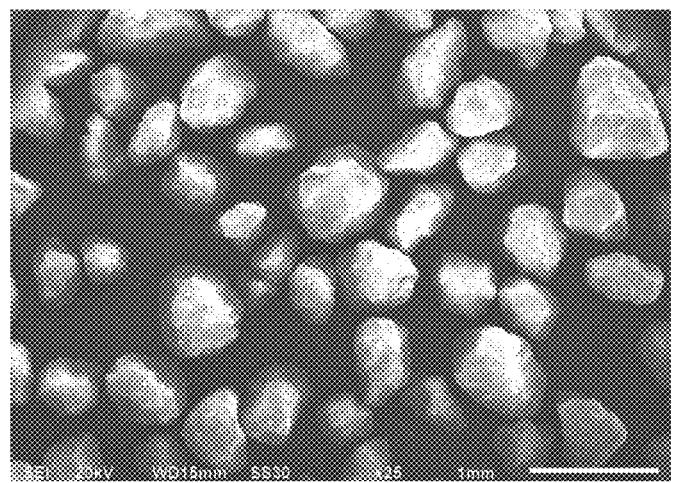
FIG. 5 shows Scanning Electronic Microscopic (SEM) Images of Agilent SLE material 2 used for SLE under 25× magnification according to an embodiment.
Figure 6:
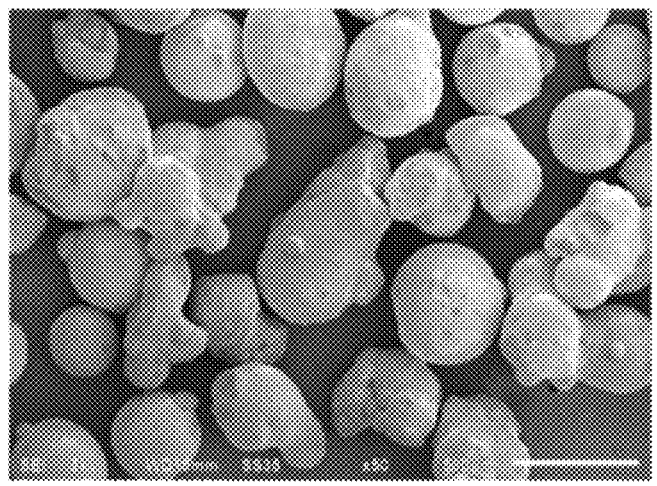
FIG. 6 shows Scanning Electronic Microscopic (SEM) Images of Agilent SLE material 3 used for SLE under 50× magnification according to an embodiment.

FIG. 4 shows Scanning Electronic Microscopic (SEM) Images of Agilent SLE material 1 used for SLE under 100× magnification according to an embodiment. FIG. 5 shows Scanning Electronic Microscopic (SEM) Images of Agilent SLE material 2 used for SLE under 25× magnification according to an embodiment. FIG. 6 shows Scanning Electronic Microscopic (SEM) Images of Agilent SLE material 3 used for SLE under 50× magnification according to an embodiment.

Figure 7:
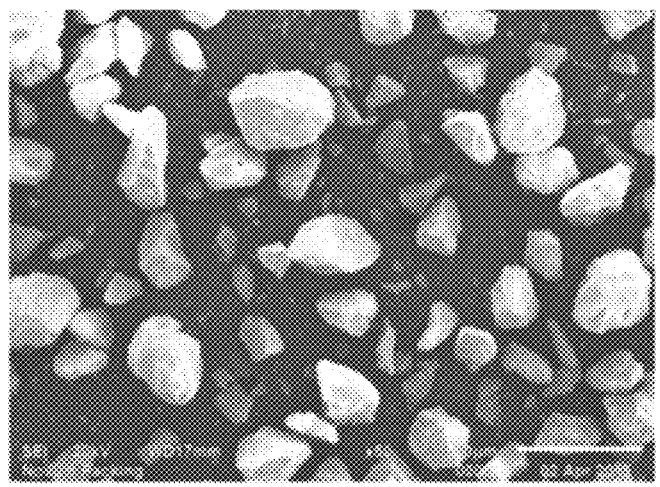
FIG. 7 shows Scanning Electronic Microscopic (SEM) Images of a competitive SLE product under 50× magnification in an analysis carried out by inventors.

In contrast, FIG. 7 shows Scanning Electronic Microscopic (SEM) Images of competitor SLE sorbent under 50× magnification in an analysis carried out by inventors. The competitive SLE sorbent shown comprises a sample obtained from Phenomenex (Torrance, Calif.) referred to as a SLE product named, Novum™.

Additional material description and characterization of these Agilent SLE material 1, 2, and 3 silica particles is described further below with respect to a comparison analysis carried out by the inventors. The comparison analysis compares Agilent SLE material 1, 2, and 3 from a competitive SLE sorbent.

Further Advantages and Features

The inventors recognized further advantages to synthetic silica particles as described herein. The inventors recognized the physical properties of the synthetic silica such as particle size, surface area, and/or porosity can be easily tuned by adjusting the synthetic parameters when different SLE characteristics are desired.

The inventors identified several advantages for synthetic silica examples over traditional diatomaceous earth for SLE workflows:

Comparable or better extraction performance in terms of analyte recovery, reproducibility, and flow consistency;
High cleanliness to minimize introduction of impurities that may produce analytical variability;
Easy adjustment of physiochemical properties including particle size, surface area, and pore size;
A reliable synthetic process allows for stringent quality control;
The synthesis is fast, simple, scalable, and low price; and
This disclosure further provides multiple sorbent media specifications to support workflows with vacuum, positive pressure and gravity.

Further description of synthetic packing material for SLE and applications therefor that can be used in further embodiments will now be described with respect to an SLE apparatus and method for extracting analytes.

Apparatus for SLE

FIG. 1 is a diagram of an apparatus 100 having synthetic silica for use as a stationary phase in SLE according to an embodiment. Apparatus 100 includes a container 110 removably coupled to a collection vial 130. A sorbent media 120 is positioned within container 110 for use as a stationary phase in supported liquid extraction. Sorbent media 120 includes synthetic silica particles as described herein. First and second layers of porous frit composition 115 and 125 respectively, are positioned within the container on opposite sides of sorbent media 120. Container 110 can have an opening on one end to receive a sample. Collection vial 130 can be arranged at another end of container 110 and configured to receive analytes extracted from an eluted sample passed through container 110.

In examples, the mass, particle size, and surface area of the synthetic silica particles in sorbent media 120 determine a loading capacity with an aqueous sample. According to one feature, SLE performance (recovery and precision) can be at least comparable to LLE.

This embodiment is illustrative and not intended to be limiting. Container 110 for example can be a tube, cartridge, well in a well plate, or other type of container suitable for SLE. Porous frit layers 115, 125 can be any type of porous frit including but not limited to a granulated glass, polymeric, and/or ceramic composition. Porous frit layers 115, 125 are also optional and can be omitted. Other materials or layers may also be used on either side of sorbent media 120 depending upon a particular SLE application as would be apparent to a person skilled in the art given this description. Collection vial 130 is also optional and other receptacles or tubing can be used to collect or pass an output sent through container 110.

Examples of the use of apparatus 100 to extract analytes of interest as in drug testing or other types of analysis is described further below with respect to FIGS. 2-3.

Method for Extracting Target Analytes

Figure 2:
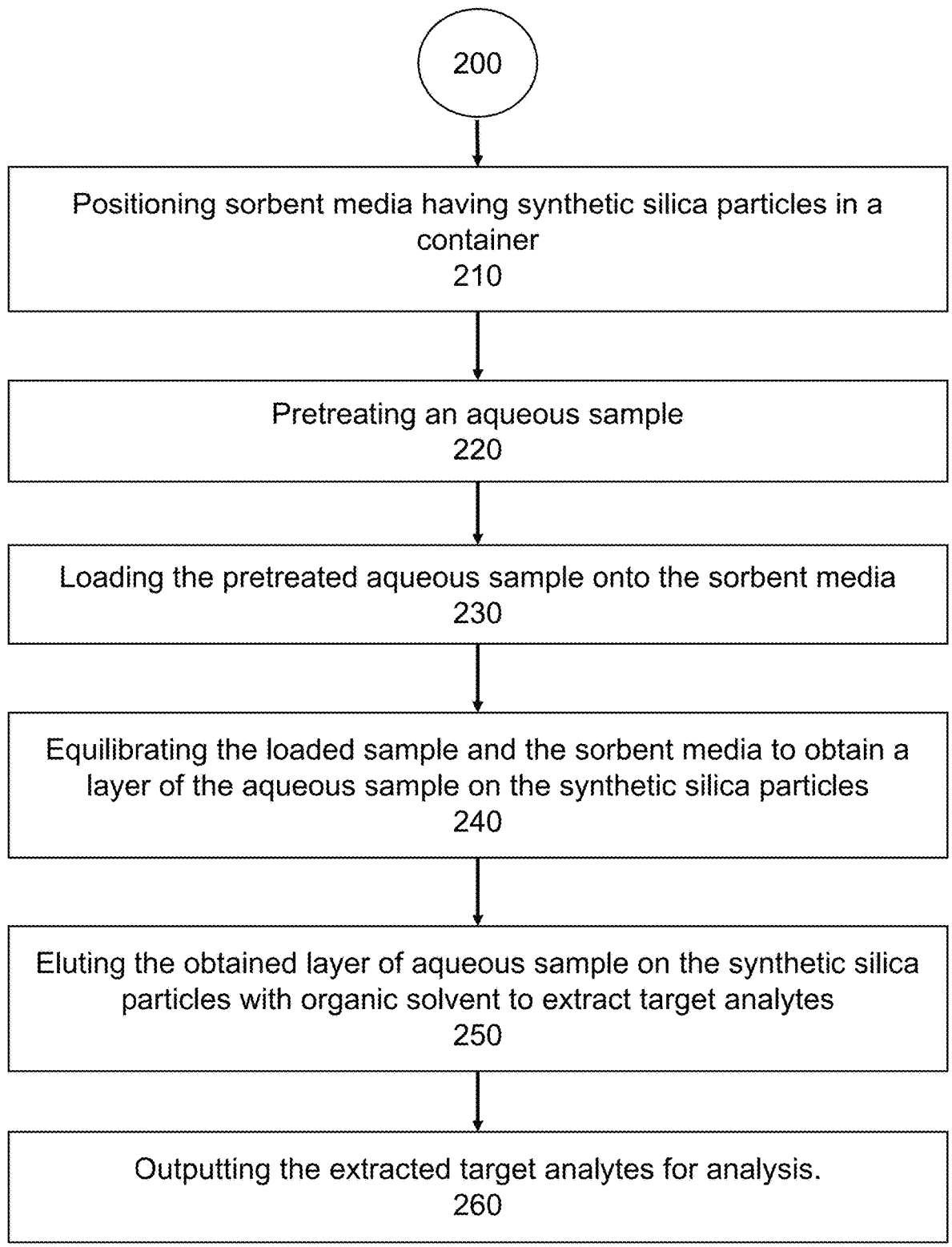
FIG. 2 is flowchart diagram of a method for extracting target analytes that includes using synthetic silica as a stationary phase in SLE according to an embodiment.

FIG. 2 is flowchart diagram of a method 200 for extracting target analytes that includes using synthetic silica as a stationary phase in SLE according to an embodiment (steps 210-260). In many examples used in sample preparation, an aqueous sample may include the analytes of interest to be extracted. Examples of an aqueous sample that may be used include but are not are not limited, blood, plasma, urine, saliva, water, or sweat. These samples may be used in drug testing for example when the analytes of interest indicate the presence of drugs, controlled substances or other chemicals in the samples. These examples are illustrative and not intended to be limiting. Other samples may be used in different applications to detect analytes of interest in pharmaceutical, forensic chemistry, environmental analysis or other SLE applications.

For brevity, method 200 will be described with reference to apparatus 100 but is not necessarily intended to be limited to this specific apparatus or example.

As shown in FIG. 2, method 200 includes positioning sorbent media in a container as a stationary phase for SLE (step 210). Sorbent media includes synthetic silica particles as described herein. The container can be a container 110 as described with respect to FIG. 1.

Sample preparation may also require first pretreating a sample (step 220). This is optional in that some aqueous samples may also not require pretreating the sample.

In step 230, an aqueous sample having analytes of interest is loaded onto sorbent media. FIG. 3 for example shows a diagram A of an aqueous sample 302 loaded onto sorbent media 304 having synthetic silica particles. Aqueous sample 302 as used here refers to an aqueous sample with or without optional pretreating.

An equilibrating step is carried out (step 240) to obtain a layer of the aqueous sample on the synthetic silica particles. For example, the aqueous sample may be allowed to soak into the stationary phase. As shown in diagram B in FIG. 3, the loaded sample and sorbent media are equilibrated on the synthetic silica particles.

Next, elution is carried out (step 250). In particular, the aqueous sample layer on the synthetic silica particles is eluted with an organic solvent to extract target analytes. For example, a water immiscible organic solvent can be passed through the sorbent media 304 stationary phase to extract analytes of interest to be collected for analysis. As shown in FIG. 3, the eluting removes analytes of interest.

In step 260, the extracted analytes of interest are outputted for analysis. For example, they can be output to a receptacle for collection as shown in diagram C in FIG. 3. In one embodiment, the synthetic silica particles have a particle size of less than about 150 μm, and the outputting includes applying a positive pressure or vacuum to initiate a flow of the aqueous sample through the synthetic silica media at a consistent flow rate. Initiating with gravity is also contemplated. In another embodiment, the synthetic silica particles have a particle size greater than about 200 μm, and the outputting includes initiating with gravity a flow of the aqueous sample through the sorbent media at a consistent flow rate.

Example Analytical Results and Discussion Relative to LLE

The inventors further performed an analysis comparing the results of LLE extraction and three lots of synthetic silica particles. The three lots of synthetic silica particles represented examples of each of respective Agilent SLE materials 1, 2, and 3. The Agilent SLE material 1, 2, and 3 were compared to LLE in this evaluation analysis and demonstrated acceptable performance of the SLE synthetic silica materials when used in an example SLE workflow.

In the analysis for testing purposes, a SLE sample preparation of human plasma was spiked with a 10 ng/mL drug of abuse mixture. Performances of the three SLE stationary phases were tested by spiking a mixture of 24 common drugs of abuse into human plasma and conducting the SLE protocol. Percent recovery was determined using pre-spiked plasma samples at 10 ng/mL and blank plasma samples post-spiked at 10 ng/mL. Both pre-spiked and blank plasma samples were diluted 1:1 (V/V) with 0.5 M ammonium hydroxide and mixed. Next, 400 μL of diluted plasma was loaded onto the stationary phase in a 3 cc cartridge. Vacuum was applied, as necessary, to pull the sample into the bed. The sample was allowed to equilibrate for 5 min before eluting with MTBE (2×2 mL). The collected eluent was evaporated to dryness and reconstituted with 200 μL of 85:15 (V/V) 5 mM ammonium formate+0.1% formic acid: acetonitrile. The samples were then injected onto an Agilent 1290LC/6490 QQQ liquid chromatography/mass spectrometer (LC/MS) system for analysis using a multiple reaction monitoring (MRM) method for quantitation.

Figure 3:
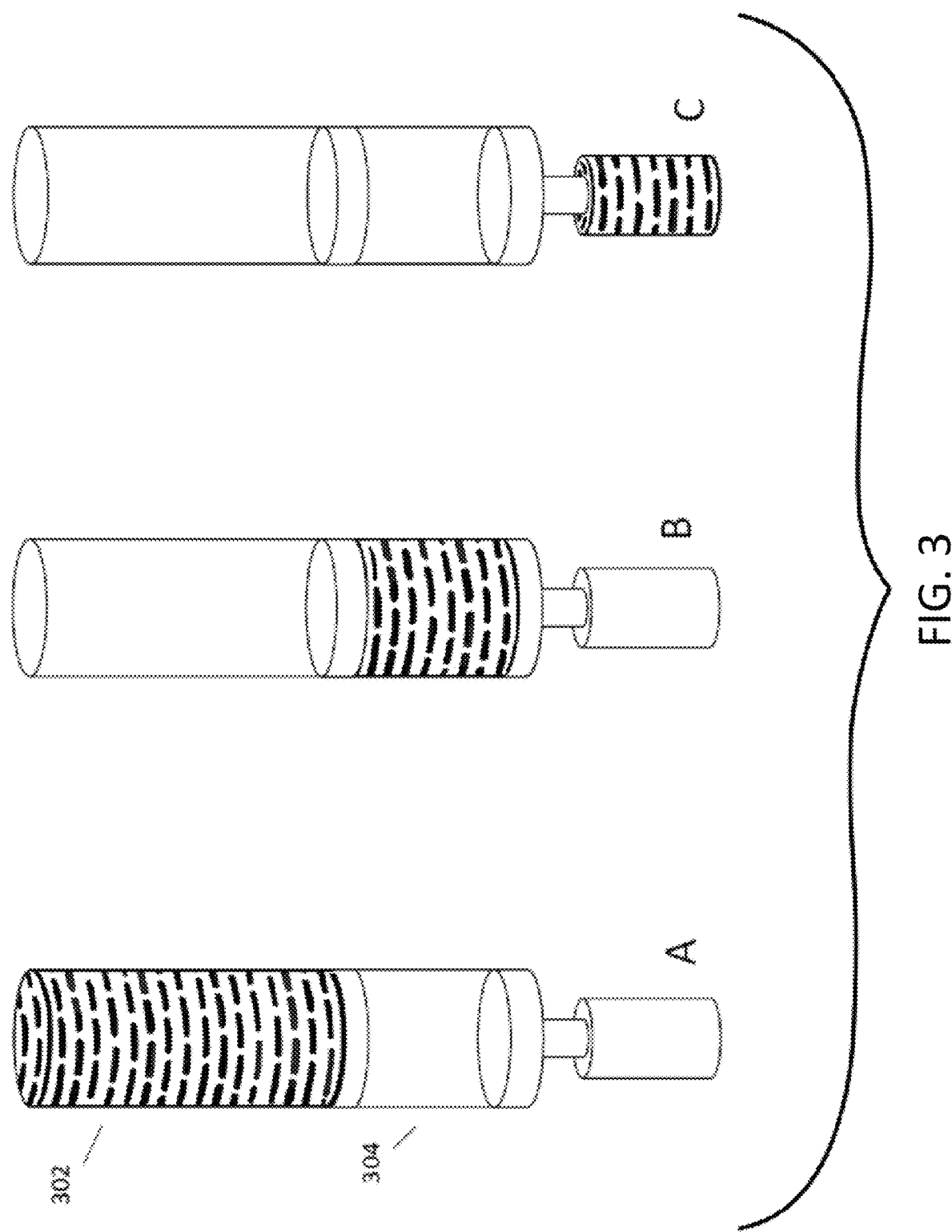
FIG. 3 is diagram illustrating aspects of the method of FIG. 2 according to an embodiment.

As shown in FIG. 3, picture A and B, the sample being tested was loaded and allowed to "equilibrate" on the SPE stationary phase for several minutes before elution to allow the formation of a thin aqueous layer for subsequent extraction. After 5 min, a water immiscible organic solvent (DCM, ethyl acetate, hexane, MTBE, etc.) was passed through the stationary phase to extract the analytes of interest. The aqueous phase remains in the cartridge while the organic extract is collect in a secondary vessel for analysis (picture C).

Table 1 summarizes the results of a LLE extraction using MTBE and 3 silica materials in an SLE workflow. Recovery (% Rec.) and reproducibility (% RSD) is shown for the 24 analytes with respect to the stationary phase. Analyte recovery is used to access material and workflow suitability, where 100% recovery indicates ideal performance. The % RSD measures method and material consistency and a range of 0-20 is acceptable. Bed masses were optimized for each synthetic silica material by measuring aqueous holding capacity with respect to bed mass using the protocol described with respect to FIG. 3. For the results shown in this example, 3 cc tubes contain 0.50 g Agilent SLE Material 1, 0.60 g Agilent SLE material 2, and 0.50 g Agilent SLE material 3.

TABLE 1

Table 1. Recovery (% Rec.) and reproducibility (% RSD) results for drugs of abuse in human plasma. LLE and SLE used methyl t-butyl ether (MTBE) for extraction and silica materials were used as a stationary phase in an SLE workflow. Analytes were spiked at 10 ng/mL in replicates of six (n = 6).

| | LLE (MTBE) | | Agilent SLE Material 1 | | Agilent SLE Material 2 | | Agilent SLE Material 3 | |
|---|---|---|---|---|---|---|---|---|
| | % Rec. | % RSD | % Rec. | % RSD | % Rec. | % RSD | % Rec. | % RSD |
| Codeine | 89.1 | 4.5 | 107.0 | 2.5 | 83.0 | 11.0 | 90.8 | 3.5 |
| Oxycodone | 87.2 | 24.5 | 98.5 | 6.7 | 81.2 | 8.0 | 82.9 | 4.7 |
| Amphetamine | 79.8 | 0.6 | 100.2 | 4.0 | 76.0 | 6.2 | 90.4 | 2.3 |
| MDA | 82.0 | 4.3 | 102.9 | 4.2 | 90.9 | 3.4 | 87.7 | 4.3 |
| Hydrocodone | 83.9 | 0.9 | 96.2 | 3.0 | 78.7 | 9.9 | 87.1 | 4.4 |
| MDMA | 64.2 | 27.6 | 97.4 | 3.6 | 89.2 | 4.1 | 94.7 | 1.5 |
| Methamphetamine | 86.4 | 10.8 | 95.2 | 6.0 | 81.6 | 6.7 | 80.8 | 1.7 |
| Strychnine | 90.6 | 6.9 | 86.8 | 8.0 | 51.2 | 11.8 | 87.9 | 5.0 |
| Phentermine | 88.4 | 8.8 | 94.9 | 2.9 | 85.2 | 7.6 | 94.3 | 3.4 |
| MDEA | ND | ND | 99.9 | 3.2 | 97.4 | 4.6 | 59.0 | 3.9 |
| Heroin | 97.7 | 8.7 | 87.4 | 2.3 | 89.0 | 8.1 | 82.8 | 7.1 |
| Cocaine | 96.3 | 2.7 | 100.2 | 3.1 | 101.5 | 3.4 | 94.5 | 3.0 |
| Meperidine | 85.4 | 7.2 | 103.1 | 4.1 | 97.2 | 3.4 | 93.8 | 2.4 |
| Trazodone | 97.7 | 2.2 | 97.6 | 2.9 | 100.2 | 2.4 | 95.0 | 1.5 |
| PCP | 37.9 | 24.2 | 99.3 | 0.7 | 58.4 | 10.9 | 64.7 | 3.7 |
| Nitrazepam | 70.9 | 26.4 | 94.3 | 6.6 | 98.3 | 5.4 | 100.2 | 2.0 |
| Oxazepam | 119.7 | 19.5 | 94.2 | 1.1 | 99.9 | 4.6 | 96.0 | 2.3 |
| Verapamil | 108.3 | 11.9 | 97.9 | 3.7 | 82.6 | 3.6 | 97.6 | 2.9 |
| Lorazepam | 51.1 | 18.0 | 98.4 | 3.1 | 93.8 | 4.7 | 82.9 | 4.9 |
| Methadone | 90.1 | 12.2 | 94.7 | 3.4 | 61.8 | 10.7 | 94.8 | 4.6 |
| Alprazolam | 36.2 | 24.1 | 93.7 | 4.0 | 84.2 | 6.7 | 68.0 | 3.9 |
| Temazepam | 112.8 | 2.8 | 99.8 | 3.7 | 97.3 | 5.4 | 96.1 | 4.6 |
| Proadifen | 34.8 | 17.3 | 79.9 | 1.4 | 38.1 | 16.5 | 97.4 | 3.2 |
| Diazepam | 91.0 | 1.9 | 100.5 | 1.7 | 102.1 | 3.6 | 35.5 | 2.0 |

Example Analytical Results and Discussion Relative to Competitive SLE Sorbent

The inventors further performed analysis comparing several examples of synthetic silica particles according to this disclosure with a competitive SLE product.

First Comparison of Three Example Types

In a first comparison, the inventors performed an analysis comparing three synthetic silica particles (Agilent SLE material 1, 2, and 3) with a competitive SLE material. Results are shown in Tables 2 and 3 below.

TABLE 2

Summary of physical properties for Agilent SLE materials and competitive SLE sorbent. Particle sizes of Agilent SLE Material 1 and a competitive SLE sorbent were measured by Beckman Coulter particle size analyzer. Particle sizes of Agilent SLE Material 2 and 3 were measured under Scanning Electronic Microscopy (SEM). Surface areas of all materials were measured using BET nitrogen adsorption analysis, where the pore sizes were determined by the peak position of adsorption curve.

| SLE sorbent | Mean Particle Size (μm) | Surface Area (m²/g) | Peak Pore Size (Å) |
| --- | --- | --- | --- |
| Agilent SLE Material 1 | 102 | 29 | >1000 |
| Agilent SLE Material 2 | 600 | 16 | >1000 |
| Agilent SLE Material 3 | 300 | 26 | >1000 |
| Competitive SLE Sorbent | 114 | 43 | 85 |

TABLE 3

Table 3. Summary of water holding capacity and flow rate properties for Agilent SLE materials and a competitive SLE material. Water holding capacity characterizes the amount of water the sorbent can hold under 15 inch of Hg vacuum. High water holding capacity is preferred since a larger volume of aqueous sample can load onto a given weight of SLE sorbent. Gravity flow rate measurement were carried out by loading 20 mL water onto 60 cc SLE tube (packed with 20 g sorbent materials) and then eluting 40 mL of Dichloromethane through the sorbent bed, where the gravity flow rate characterizes the flow rate of dichloromethane. Generally, a gravity flow rate of about 3-4 mL/min is preferred to balance analyte recovery and elution time.

| SLE sorbent | Water Holding Capacity | Gravity Flow Rate |
| --- | --- | --- |
| Agilent SLE Material 1 | 120% | 1 mL/min |
| Agilent SLE Material 2 | 100% | 3-4 mL/min |
| Agilent SLE Material 3 | 105% | 3-4 mL/min |

Glossary

The following glossary is provided to further aid understanding:
BET—Brunauer, Emmett and Teller
ICP—Inductively coupled plasma
LC—Liquid chromatography system
LLE—Liquid-liquid extraction
MS—Mass spectrometer
SEM—Scanning electron microscope
SLE—Supported-liquid extraction
QQQ—Triple quadrupole While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An apparatus for supported liquid extraction, comprising:
    a container removably coupled to a collection vial; and
    a sorbent media positioned within the container as a stationary phase in the supported liquid extraction,
    wherein the sorbent media are synthetic particles consisting essentially of silica having a surface area less than about 30 m²/g.

2. The apparatus of claim 1, wherein the synthetic silica particles have a substantially uniform particle shape.

3. The apparatus of claim 2, wherein the substantially uniform particle shape comprises a substantially spherical shape having a substantially uniform diameter across a distribution of the synthetic silica particles.

4. The apparatus of claim 1, wherein the synthetic silica particles have a particle size in a range of about 30-150 μm inclusive.

5. The apparatus of claim 1, wherein the synthetic silica particles have a particle size greater than about 200 μm.

6. The apparatus of claim 1, wherein the synthetic silica particles have a pore size greater than about 500 Angstroms.

7. The apparatus of claim 1, further comprising:
    first and second layers of porous frit composition positioned within the container on opposite sides of the sorbent media.

* * * * *